(12) United States Patent
Kalama et al.

(10) Patent No.: US 11,373,363 B2
(45) Date of Patent: *Jun. 28, 2022

(54) SYSTEMS AND METHODS OF REAL-TIME AMBIENT LIGHT SIMULATION BASED ON GENERATED IMAGERY

(71) Applicant: Disney Enterprises, Inc., Burbank, CA (US)

(72) Inventors: Asa K. Kalama, Burbank, CA (US); Jose Gutierrez, Burbank, CA (US); Paul Bailey, Burbank, CA (US); Karl Nettmann, Burbank, CA (US); William Hastings, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/216,092

(22) Filed: Mar. 29, 2021

(65) Prior Publication Data

US 2021/0217226 A1 Jul. 15, 2021

Related U.S. Application Data

(63) Continuation of application No. 16/166,964, filed on Oct. 22, 2018, now Pat. No. 10,997,781.

(60) Provisional application No. 62/610,842, filed on Dec. 27, 2017.

(51) Int. Cl.
*G06T 15/50* (2011.01)
*G06T 15/60* (2006.01)

(52) U.S. Cl.
CPC ............ *G06T 15/506* (2013.01); *G06T 15/60* (2013.01)

(58) Field of Classification Search
CPC ....... G06T 15/506; G06T 15/60; G09B 9/003; G09B 9/02; A63F 13/28; A63F 13/807; A63F 13/90; H05B 47/155
See application file for complete search history.

(56) References Cited

U.S. PATENT DOCUMENTS

| 4,313,726 | A | 2/1982 | Chase |
| 5,363,475 | A | 11/1994 | Baker et al. |
| 5,415,549 | A | 5/1995 | Logg |
| 7,246,050 | B2 | 7/2007 | Sheridan |
| 7,487,074 | B2 | 2/2009 | Ohtsu et al. |
| 9,652,892 | B2 * | 5/2017 | Tomlin ................. G02B 27/017 |

(Continued)

OTHER PUBLICATIONS

U.S. Appl. No. 16/166,964, "Notice of Allowance", dated Feb. 3, 2021, 9 pages.

*Primary Examiner* — David T Welch
(74) *Attorney, Agent, or Firm* — Kilpatrick Townsend & Stockton LLP (57) ABSTRACT

Systems and methods for simulation of ambient light based on generated imagery are disclosed herein. Such a system can include a simulation sled, a simulation display that can display generated imagery viewable from the simulation sled, an ambient light simulator that can selectively illuminate portions of the simulation sled, and a processor. The simulation sled can include a plurality of user controls. The processor can: control the simulation display to generate imagery; identify an effect of the generated imagery on the simulation sled; and control the ambient light simulator to selectively illuminate at least portions of the simulation sled according to the identified effect of the simulated light source.

20 Claims, 5 Drawing Sheets

(56) References Cited

U.S. PATENT DOCUMENTS

| | | | |
|---|---|---|---|
| 10,475,248 B1* | 11/2019 | Klein | G06T 15/55 |
| 2003/0057884 A1 | 3/2003 | Dowling et al. | |
| 2015/0187093 A1* | 7/2015 | Chu | G09G 5/00 |
| | | | 345/426 |
| 2017/0162168 A1 | 6/2017 | Lopez et al. | |
| 2017/0230648 A1 | 8/2017 | Iwasa et al. | |
| 2019/0102934 A1* | 4/2019 | Neulander | G06T 19/006 |
| 2019/0114828 A1* | 4/2019 | Trowbridge | G06T 15/506 |
| 2020/0074725 A1* | 3/2020 | Skidmore | G06T 19/006 |

* cited by examiner

SYSTEMS AND METHODS OF REAL-TIME AMBIENT LIGHT SIMULATION BASED ON GENERATED IMAGERY

CROSS-REFERENCE TO RELATED APPLICATIONS

This application is a continuation of U.S. application Ser. No. 16/166,964, filed on Oct. 22, 2018, which claims priority to U.S. Provisional Application No. 62/610,842, filed Dec. 27, 2017, which are incorporated by reference herein in their entirety.

BACKGROUND

The present disclosure relates generally to the creation of a simulated experience. A simulation is the imitation of a real-world process or event over time, or the imitation of an imaginary process or event over time. Simulations can include, for example, a simulation of operation of a vehicle such as a car, an airplane, a boat, or a spaceship.

In a simulation, care is given to recreate the complete real experience in the simulated environment. This can include the creation of a simulation sled that has the appearance of, for example, the inside of a car, an airplane, a boat, or a spaceship. This can include having similar or identical controls or control layouts. In many instances, the creation of a simulation can further include the generation of one or several effects including sound effects, movement effects, and lighting effects to increase the realism of the simulation.

The difficulty of the generation of these effects has increased over time due in part to higher demands for realism, but also due to the increasing complication of simulations. The complexity of a simulation is particularly increased when the simulation is, on-the-fly, changed based on received user inputs. This prevents the generation of a small set of effects and then the repeated use of those effects as scenarios giving rise to those effects may not be repeated. Therefore, it is desirable to provide new systems and methods for improving simulations and the effects used in those simulations.

BRIEF SUMMARY

Embodiments can provide systems and methods for real-time ambient light simulation based on generated imagery. This can particularly include identifying one or several light-generating objects in to be generated imagery and generating an ambient light simulation corresponding to a determined effect of those one or several light-generating objects. The ambient light simulation can create one or several simulated illuminated areas or shadows.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

I. Introduction

Simulation of activity presents many difficulties. These difficulties have only increased over time as common exposure to, and experience with gaming and virtual activities have increased. One problem in a simulation arises from the insufficiency of light coming from a simulated object or a simulated effect to illuminate real objects. For example, while a simulated sun, a simulated neon sign, or simulated explosion can be displayed on a screen, that simulated sun, simulated neon sign, or simulated explosion may not cause the real effects of illuminating real objects sufficiently to cast shadows or to heat those real objects. Thus a user in a simulation with the simulated sun, the simulated neon sign, or the simulated explosion would not experience the real effects of that simulated sun, simulated neon sign, or simulated explosion as he would not see shadows or illumination attributable to the simulated sun, the simulated neon sign, or simulated explosion, or feel warmth attributable to the simulated sun, the simulated neon sign, or simulated explosion.

The difficulty of this simulation of ambient light from generated imagery is further increased when the generated imagery is connected with a gaming experience and/or is variable based on at least one user input. In such an embodiment, the simulated ambient lighting is not static and repeatable, but rather is dynamic based on specific received user inputs and the progression of the narrative and/or gameplay within the simulation. As used herein, the narrative of a simulation refers to the possible events and/or experiences that are included in the simulation. The possible events and/or experiences included in the simulation can be tied to a timeline within the simulation, which timeline can be static in that it always has the same length or the timeline can be dynamic in that it can have variable lengths.

The present disclosure provides new systems and methods for simulation of ambient light based on generated imagery. In these systems and methods, locations and/or attributes of one or several sources of simulated light can be tracked and the effects of these one or several sources of simulated light can be simulated via one or several controllable light sources. These one or several controllable light sources can include one or several projectors, practical light effects, movable lighting fixtures, heaters such as radiant heaters, or the like.

The locations and/or attributes of one or several sources of simulated light can include, for example, a simulated location of some or all of the one or several sources of simulated light, a simulated movement of some or all of the one or several sources of light, a color or emission spectrum of some or all of the one or several sources of light, an intensity or brightness of some or all of the one or several sources of light, or the like. A light solution can be generated based on the locations and/or attributes of some or all of the one or several sources of light. This light solution can identify the desired output of simulated ambient light based on the generated imagery. This can include attributes such as: location, movement, and/or contrast of one or several desired shadows; and/or location, movement, color, and/or brightness of one or several illuminated areas.

This problem of lack of ambient light from generated imagery within a simulation can occur in a simulation of an experience, in a video game or gaming simulation, or in an amusement park ride including generated imagery.

II. Simulation System

Figure 1:
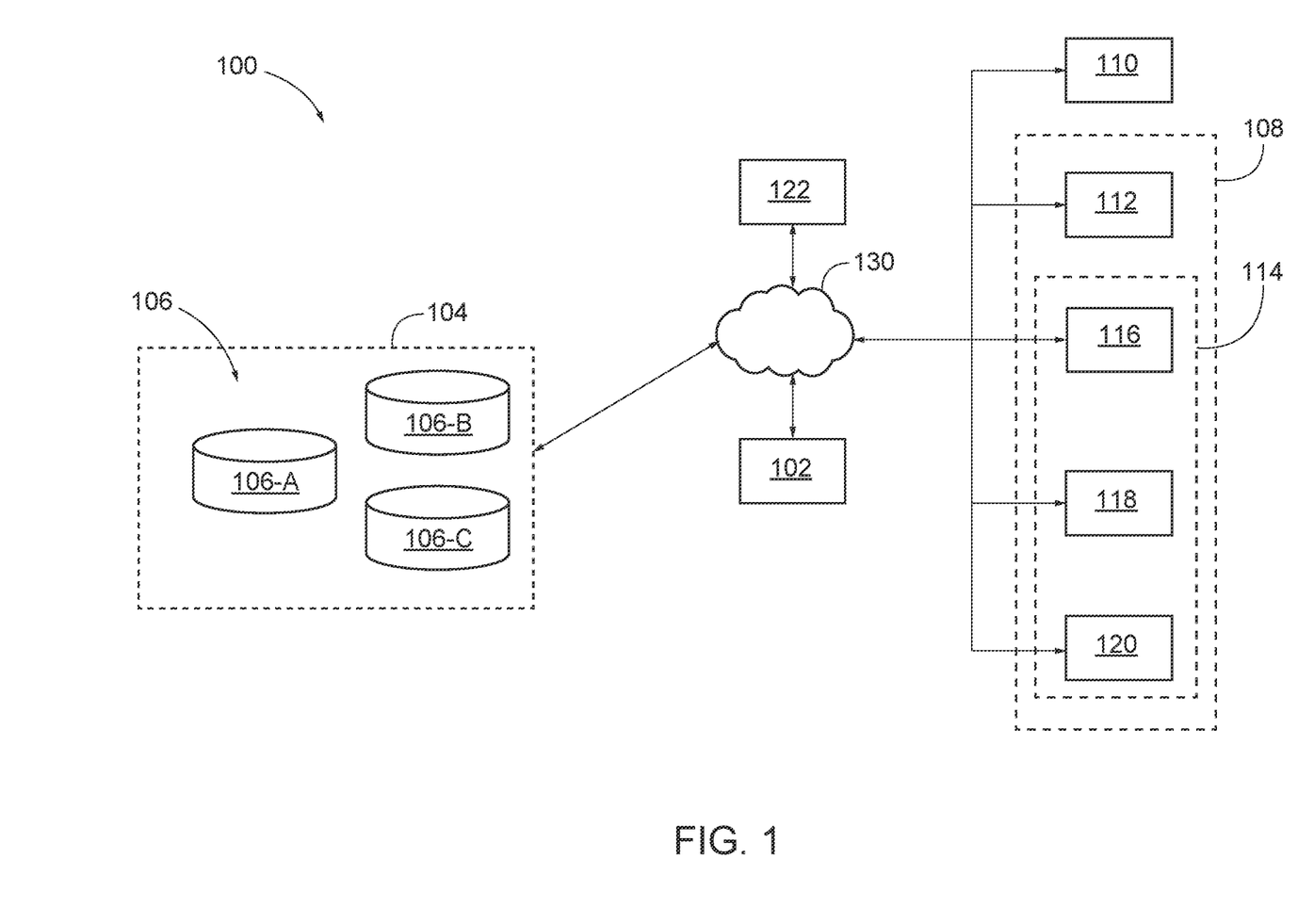
FIG. 1 is a schematic illustration of one embodiment of a simulation system for simulation of ambient light based on generated imagery.

With reference now to FIG. 1, a schematic illustration of one embodiment of a simulation system 100 for simulation of ambient light based on generated imagery is shown. The system 100 can include a processor 102. The processor 102 can be any computing and/or processing device including, for example, one or several laptops, personal computers, tablets, smartphones, servers, mainframe computers, processors, or the like. The processor 102 can be configured to receive inputs from one or several other components of the system 100, to process the inputs according to one or several stored instructions, and to provide outputs to control the operation of one or several of the other components of the system 100.

In some embodiments, the processor 100 can include a game engine that can include a rendering engine. The game engine and the rendering engine can together, or independently develop and/or progress the narrative of the simulation and/or the generated images corresponding to that narrative. Some or all of these images of objects can be static with respect to a simulation sled or a user position, or some or all of these images of objects can be dynamic with respect to the simulation sled or user position.

In some embodiments, some or all of these generated images can be of objects or effects that generate and/or reflect light. These objects can include, for example, one or several lights, light bulbs, or lighting features, and/or one or several suns, stars, or moons. In some embodiments, these effects can include any simulated light-generating event such as, for example, one or several: explosions; fires or combustion events; energy beams; and/or muzzle blasts. As referred to herein light-generating objects of a simulation include light-generating effects.

The system 100 can include memory 104. The memory 104 can represent one or more storage media and/or memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, and/or various other storage mediums capable of storing that contain or carry instruction(s) and/or data. The memory 104 can be an integral part of the processor 102 and/or can be separate from the processor 102. In embodiments in which the memory 104 is separate from the processor 102, the memory 104 and the processor 102 can be communicatingly linked via, for example, communications network 130. In some embodiments, the communications network 130 can comprise any wired or wireless communication connection between the components of the simulation system 100.

The memory 104 can include software code and/or instructions for directing the operation of the processor 102 and/or one or several databases 106 containing information used by the processor 102 and/or generated by the processor 102. These databases include, for example, a narrative/imagery database 106-A, a sled database 106-B, and an illumination database 106-C.

The narrative/imagery database 106-A stores narrative and image data. This narrative and image data can include information and/or data relating to the narrative and the imagery generated as part of the narrative. Specifically, the narrative and image data is data and information that is used to generate the narrative and the imagery and/or sound in the narrative. This can include identification of one or several: objects; characters; effects; or things existing within the narrative, and data or databases defining these one or several: objects; characters; effects; or things. This data or databases defining the one or several: objects; characters; effects; or things can identify attributes of the one or several objects: characters; effects; or things, which attributes can define a size, a speed, movement characteristics, illumination characteristics, or the like. These illumination characteristics can characterize the illumination generated by the associated object such as, for example, the strength of the illumination, the color of the illumination, directionality of the illumination, or the like.

The sled database 106-B can include data relating to the simulation sled, and specifically relating to the shape and/or features of the simulation sled and/or relating to the control of the simulation sled and/or the interaction with user control features located on the simulation sled. In some embodiments, for example, the simulation sled can move in response to user inputs to the user control features and/or according to the narrative of the simulation or to events in the narrative of the simulation. The sled database 106-B can include data identifying one or several features of the simulation sled that enable the movement of the simulation sled. These features can include, for example, one or several motors, servo motors, pneumatic or hydraulic components, or the like.

The illumination database 106-C can include information relating to the control of an ambient light simulator to generate simulated ambient light corresponding to generated imagery. In some embodiments, this information can identify one or several components of the ambient light simulator such as, for example, a projector, practical lighting, or the like, and information identifying the simulated light creatable by those one or several components.

The system 100 can include the simulation sled 108. The simulation sled 108 can contain one or several simulatees in, for example, a seat, a restraint system, or the like. The simulation sled 108 and/or the components thereof can be communicatingly connected with the processor 102 The simulation sled 108 can be movable according to the narrative and/or according to one or several events in the narrative to, in combination with generated imagery, create the sensation of movement for the simulatees. In some embodiments, the simulation sled 108 can be mounted on a motion base 110 which can move the simulation sled 108. The motion base 110 can include one or several: motors; servo motors; pneumatic components; hydraulic components; or the like.

The simulation sled 108 can include one or several user controls 112. The user controls 112 can include features to provide information to the users such as, for example, one or several displays, screens, monitors, speakers, or the like, and can include features with which the user can provide input to the simulation sled 108. In some embodiments, the simulation sled 108 can comprise a single set of user controls 112 for use by a single user in interacting with the simulation, and in some embodiments, the simulation sled 108 can comprise multiple sets of user controls 112. In some embodiments, these multiple sets of user controls can be redundant, and in some embodiments, these multiple sets of user controls can be non-redundant in that some or all of these multiple sets of user controls provide different, unique user inputs. In some embodiments, the user controls 112 can include, for example, one or several: wheels; levers; buttons; control sticks; pedals; switches; slides; and knobs. In some embodiments, the simulation sled 108 can move and/or be configured to move according to control signals received from the processor 102 and/or the user control features.

The simulation sled 108 can include an ambient light simulator 114, also referred to herein as a simulated light source, the light generator, or the ambient light generator. The ambient light simulator 114 can be configured to generate electromagnetic radiation, and specifically to generate simulated ambient light corresponding to generated imagery, and specifically corresponding to generated imagery of one or several light-generating and/or light reflecting objects. The ambient light simulator 114 can be configured to selectively illuminate at least portions of the simulation sled 108 and/or to generate one or several shadows in and/or on the simulation sled 108. In some embodiments, the ambient light simulator 114 can be configured to generate electromagnetic radiation to heat the simulatees in correspondence with generated imagery. The ambient light simulator 114 can be communicatingly connected to the processor 102 and/or controlled by the processor 102, and can thus operate according to control signals received from the processor 102. The ambient light simulator 114 can comprise one or several projectors and/or practical lighting.

The ambient light generator 114 can include a light projector 116, internal lighting 118, and/or external lighting 120. In some embodiments, all or portions of the ambient light generator 114 can be static with respect to the simulation sled 108, and in some embodiments, all or portions of the ambient light generator 114 can move with respect to the simulation sled 108. The light projector 116 can be located within the simulation sled 108 or can be located outside of the simulation sled 108. The light projector 116 can be controlled by the processor 102 to, in real-time, project light and shadows onto all or portions of the simulation sled 108 such as, for example, on the user controls 112 of the simulation sled. The processor 102 can control the light projector 116 to project light having an intensity, color, location, and/or movement corresponding to the one or several objects in the generated imagery for which the ambient light is simulated.

The internal lighting 118 can comprise one or several fixed lighting features located within the simulation sled 108. The internal lighting 118 can include, for example, lighting features that are configured to illuminate multiple portions of the interior of the simulation sled 108 such as, for example, cast a colored light over all of the interior of the simulation sled 108. The internal lighting 118 can include lighting features that are configured to illuminate a single feature or a single set of features of the simulation sled 108 such as, for example, one or several lights associated with one or several user control features such as one or several: buttons; knobs; or the like. In some embodiments, for example, one or several lights associated with one or several user control features can be configured to emphasize the ambient illumination of those one or several user control features in correspondence with the generated imagery.

The external lighting 120 can include one or several lights and/or projectors that are configured to illuminate the simulation sled 108 to generate, in real-time with generated imagery, simulated shadows. In some embodiments, the external lighting 120 can be movable with respect to the simulation sled 108 to simulate, for example, relative movement of the object in the generated imagery with respect to the simulation sled 108. In some embodiments, at least some of the internal lighting 118 and/or the external lighting 120 can comprise practical lighting.

The system 100 can include an image generator 122, also referred to herein as a simulation display. The image generator 122 can be communicatingly connected with the processor 102 and can comprise one or several features configured to generate images according to one or several control signals received from the processor 102. The image generator 122 can comprise one or several screens, displays, monitors, projectors, illuminators, lasers, or the like. In some, the one or several screens, displays, monitors, projectors, illuminators, and/or lasers forming the image generator 122 can be connected to the simulation sled 108 such that they move with the simulation sled 108, or the one or several screens, displays, monitors, projectors, illuminators, and/or lasers forming the image generator 122 can be separated from the simulation sled 108 so as to not move with the simulation sled 108. In some embodiments, the one or several screens, displays, monitors, projectors, illuminators, and/or lasers forming the image generator 122 can be wholly or partially: flat; curved; domed; arched; and/or angled. The generated images can be viewable by the simulatee from the simulation sled 108.

Figure 2:
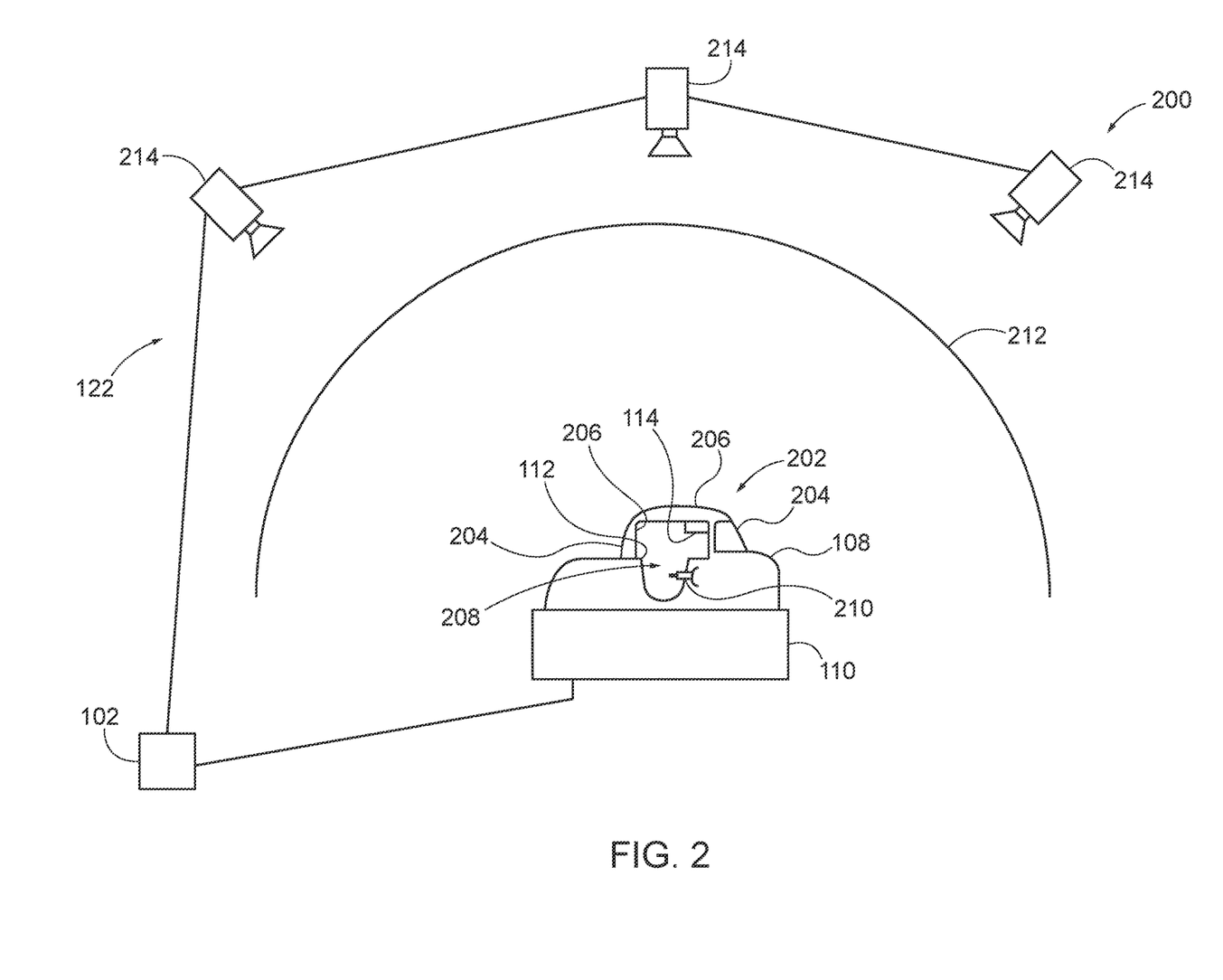
FIG. 2 is a schematic illustration of one embodiment of a simulation environment.

With reference to FIG. 2, a schematic illustration of a simulation environment 200 is shown. The simulation environment 200 can include all or portions of the system 100. Specifically, as seen in FIG. 2, the simulation environment 200 includes the simulation sled 108, the motion base 110, the user controls 112, and the light generator 114. The simulation sled 108 shown in FIG. 2, further includes a body 202 including windows 204 and opaque structural features 206 such as, for example, a roof, pillars, posts, and/or window frames or framing. The simulation sled 108 can further include a passenger area 208 that can include one or several seats, restraints, or the like, and one or several accessory features 210 which can be, for example, one or several simulated weapons such as a simulated firearm, a simulated laser, a simulated missile, a simulated bomb, or the like.

The simulation environment 200 can include the image generator 122. The image generator 122 can include a screen 212 and at least one projector 214. The screen 212 can comprise a variety of shapes and sizes and can be made from a variety of materials. In some embodiments, the screen 212 can be flat, and in some embodiments, the screen 212 can be angled, curved, domed, or the like. In some embodiments, the screen 212 is curved and/or domed to extend around all or portions of the simulation sled 108, and specifically is curved and/or domed to extend around portions of the simulation sled 108 so that a passenger looking out of the simulation sled 108 sees the screen.

One or several projectors 214 can project images onto the screen 212. These projectors 214 can be located on the same side of the screen 212 as the simulation sled 108 or on the opposite side of the screen 212 as the simulation sled. The projectors 214 can be controlled by the processor 102.

III. Simulation Sled

Figure 3:
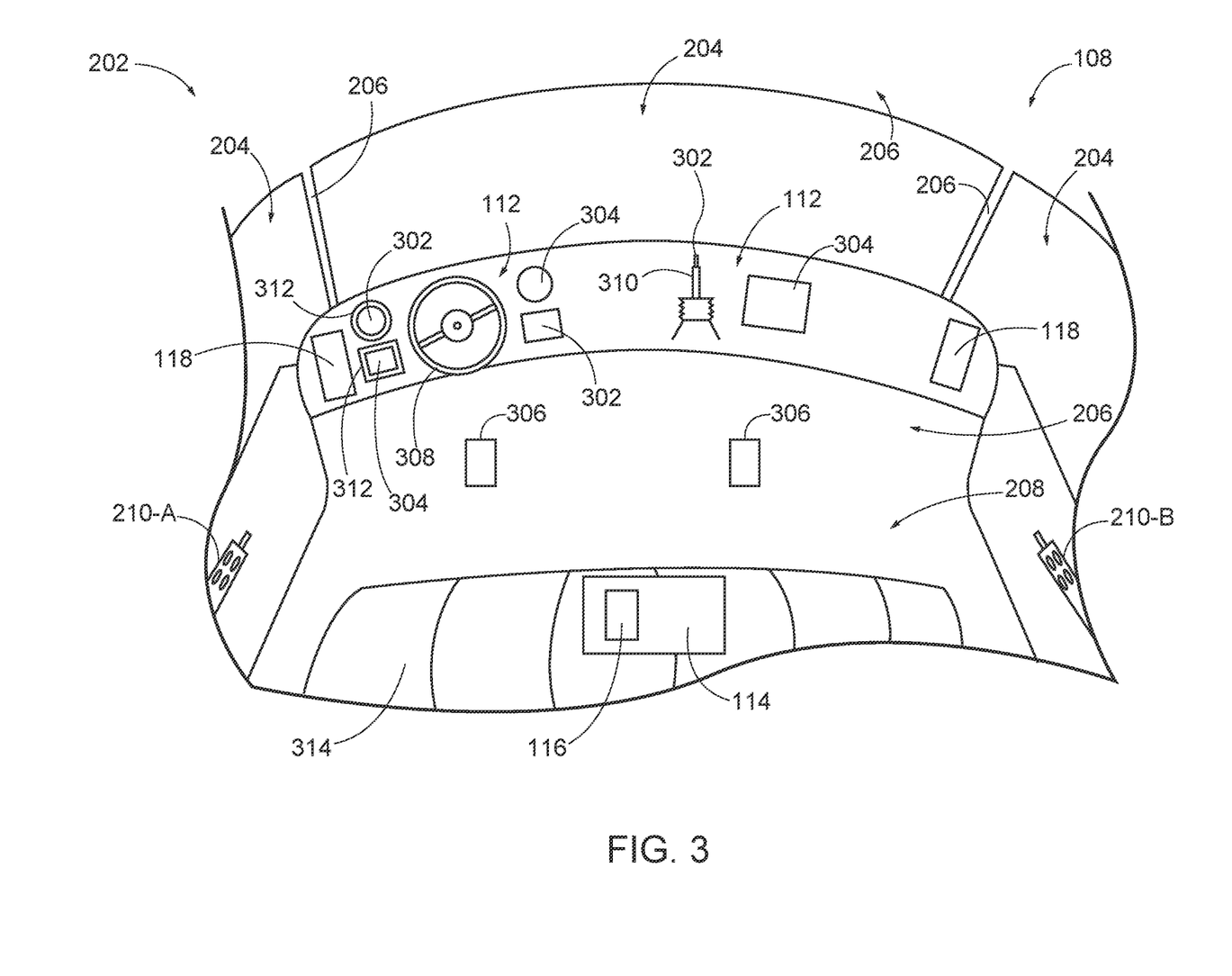
FIG. 3 is an illustration of one embodiment of a passenger area of a simulation sled in a simulation environment.

With reference now to FIG. 3, an illustration of one embodiment of the passenger area 208 of the simulation sled 108 is shown. The simulation sled 108 includes the user controls 112 and the light generator 114. The light generator 114 can include the light projector 116 and the internal lighting 118. The user controls 112 can include one or several: buttons 302; displays 304, including screens, monitors, touchscreens, or the like; pedals 306; steering wheels 308; control sticks 310; or the like. In some embodiments, some or all of the user controls 112 can be redundant so that multiple users can control the same functionality of the simulation sled 108 and/or of the simulation, and in some embodiments, some or all of the user controls 112 can be non-redundant so that different users can control different functionality of the simulation sled 108.

In some embodiments, some or all of the user controls 112 can be illuminated. The illuminated user controls 112 can form part of the internal lighting 118 of the simulation sled 108 when the illumination of the illuminated user controls 112 is controllable to contribute to simulated ambient light of generated imagery. In some embodiments, some or all of the user controls 112 can include an illumination feature 312 that can extend around all or portions of the perimeter of the user controls 112, and specifically around all or portions of the buttons 302 or displays 304. In some embodiments, some or all of the user controls 112 can have interior illumination that can cause all or portions of said user controls 112 to be illuminated and/or glow. In some embodiments, the illumination feature 312 and/or the interior illumination of the user controls 112 can vary the color and/or brightness of the associated user controls 112.

As seen in FIG. 3, the simulation sled 108 can include a seat 314, accessory features 210 which comprise a left accessory 210-A and a right accessory 210-B, and the body 202 including windows 204 and opaque structural features 206. In some embodiments, the light generator 114 can generate simulated ambient lighting, and specifically simulated shadows based on the body 202 including the windows 204 and the opaque structural features 206 and generated imagery. In some embodiments, the generation of such shadows can include the generation of data indicative of the body 202 including the windows 204 and the opaque structural features 206 of the simulation sled 108 that can be accessible by the processor 102. This data can be, for example, stored in the memory 104, and specifically in the sled database 106-B and/or in the illumination database 106-C.

IV. Simulation of Ambient Light

Figure 4:
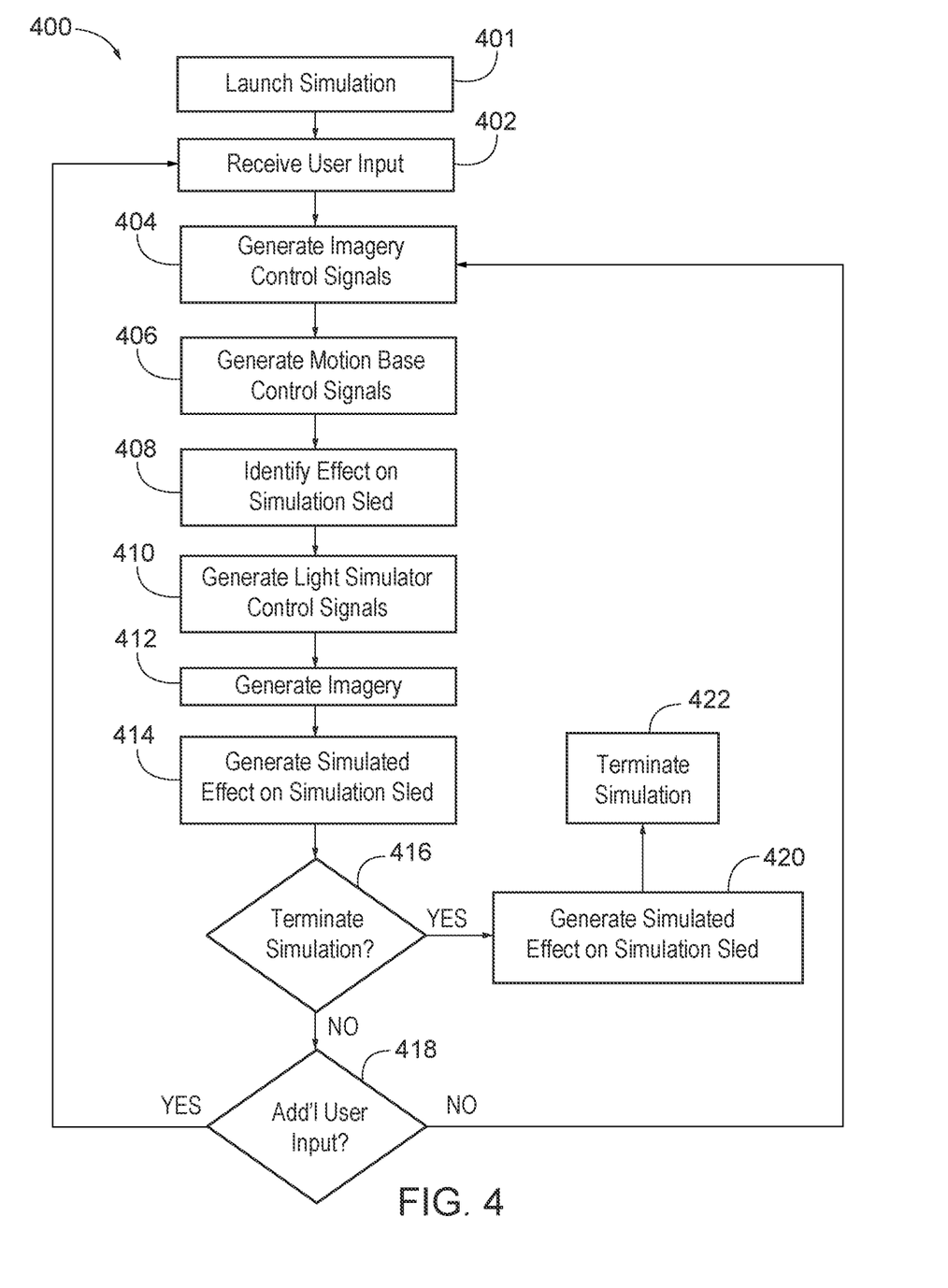
FIG. 4 is a flowchart illustrating one embodiment of a process for simulation of ambient light based on generated imagery.

With reference now to FIG. 4, a flowchart illustrating one embodiment of a process 400 for simulation of ambient light based on generated imagery is shown. The process 400 can be performed by all or portions of the simulation system 100, and can be used in generating, in real-time, simulated ambient light and/or shadows based on imagery generated by the image generator 122. The process 400 begins at block 401, wherein a simulation is launched. In some embodiments, the launch of the simulation can include the generation and/or display of one or several images as part of the narrative of the simulation. In some embodiments, the launch of the simulation can include the loading of simulation data into the gaming engine and/or rendering engine of the processor 102, and/or loading any user data relevant to the simulation into the gaming engine and/or the rendering engine of the processor 102. The simulation can be launched for the simulation sled 108 by the processor.

After the simulation has been launched, the process 400 proceeds to block 402, wherein a user input is received. In some embodiments, the user input can be received at the simulation sled 108 via user interaction with one or several of the user controls 112. This interaction can include, for example, pressing one or several buttons, manipulating one or several knobs, levers, control sticks, or toggles, depressing one or several pedals, and/or turning one or several steering wheels. These interactions with the user controls 112 can control the movement of the simulation sled 108 within the simulation and/or cause an effect within the simulation such as, for example, the firing or discharging of a weapon in the form of the accessory features 210 of the simulation sled 108. In some embodiments, the discharging of a weapon in the form of the accessory features 210 can cause an effect in the simulation such as a transient lighting effect that can be caused by the muzzle flash of the discharged weapon, the traveling of an energy beam or projectile through the simulation, and/or an explosion or fire caused by the projectile and/or energy beam. In some embodiments, the discharge of the weapon in the form of the accessory feature 210 can result in the damage to and/or destruction of one or several objects within the simulation. The user interaction with these one or several user controls 112 can result in the generation of one or several electrical signals which can be communicated to the processor.

After the user input has been received, the process 400 proceeds to block 404, wherein one or several imagery control signals are generated. In some embodiments, for example, these one or several imagery control signals can be provided to the image generator 122 to control the image generator 122 to cause the display of one or several images to passengers on the simulation sled 108. Specifically, these one or several imagery control signals can control the image generator to generate imagery comprising a simulated light source. The one or several control signals can be generated by the game engine and/or the rending engine of the processor 108 in response to the electrical signals corresponding to the user input and the progression through the simulation and/or through the narrative of the simulation.

At block 406 of the process 400, one or several motion base control signals are generated. In some embodiments, these one or several motion base control signals can be generated by the server and particularly by the gaming engine and/or the rendering engine. These one or several motion base control signals can control the motion base 110 to generated one or several desired movements of the simulation sled 108. In some embodiments, the one or several motion base control signals can be generated in response to the electrical signals corresponding to user input and the progression through the simulation and/or through the narrative of the simulation.

At block 408 of the process 400, the effect of the imagery generated by the imagery control signals on the simulation sled 108 is determined. In some embodiments, for example, this can include identifying portions of the to be generated imagery corresponding to light-generating objects, and retrieving attribute data for these objects. In some embodiments, this attribute data can include data characterizing one or several illumination characteristics of the objects in the to be generated imagery including, for example, intensity, position, directionality, and/or color of the illumination. After the attribute data has been retrieved, information characterizing the distance of the objects in the to be generated imagery from the simulation sled 108 and/or the relative motion of the objects in the to be generated imagery with respect to the simulation sled 108 can be retrieved.

In some embodiments, the processor 102, and particularly the game engine and/or the rendering engine can utilize the attribute data and other retrieved data to determine the effect of the objects in the to be generated imagery on the simulation sled 108. In some embodiments, this can include, for example, determining one or several illumination intensities of simulated light impinging on the simulation sled 108, one or several instantaneous directions of illumination of the simulation sled 108 and/or directions of illumination of the simulation sled 108 over time, and/or one or several colors of illumination of the simulation sled 108. In some embodiments, the identified effect of the to be generated imagery of the simulation sled 108 can include dynamic simulated shadows cast based on the movement of the simulated light source with respect to the simulation sled 108 and at least one feature of the simulation sled 108 such as, for example, at least one window 204 and/or at least one opaque structural feature 206.

In some embodiments, determining the effect on the simulation sled 108 can include the balancing of one or several light sources. In some embodiments, for example, multiple light-generating and/or reflecting objects can be simultaneously simulated in the to be generated imagery. In such embodiments, the effect of one or several of these multiple light-generating and/or reflecting objects can be mitigated and washed out by one or several others of these multiple light-generating and/or reflecting objects having light of significantly higher intensity. Thus, in some embodiments, the determining of the effect on the simulation sled 108 can include identifying one or several dominant light sources. In some embodiments, these one or several dominant light sources can be identified based on the intensity of light at the simulation sled 108 from those dominant light sources as compared to others of these multiple light-generating and/or reflecting objects. In some embodiments, the determining of the effect on the simulation sled 108 can be simplified by eliminating the effect of non-dominant light sources, whereas in some embodiments, the determining of the effect on the simulation sled 108 can include the effect of these non-dominant light sources.

After the effect on the simulation sled 108 has been identified, the process 400 proceeds to block 410, wherein one or several light simulator control signals are generated. In some embodiments, these one or several light control signals can control the generation of illumination and/or shadows on and/or within the simulation sled 108 to simulate the ambient light generated by the objects in the to be generated imagery. These objects in the to be generated imagery can be static with respect to the simulation sled 108 and/or dynamic with respect to the simulation sled 108. In some embodiments, the objects can move with respect to the simulation sled 108 based on inputs received from the user controls 112. In some embodiments, the light simulator control signals can be generated so as to cause the light simulator 114 to simulate the effect on the simulation sled 108 identified in block 408.

After the light simulator control signals have been generated, the process 400 proceeds to block 412, wherein the imagery corresponding to the generated imagery control signals is generated and/or to block 414, wherein the simulated effect is generated on the simulation sled 108 via the simulation of ambient light corresponding to the generated imagery. In some embodiments, this imagery is generated by sending the imagery control signals from the processor 102 to the image generator 122. In some embodiments, the ambient light of the generated imagery can be simulated by the controlling of the light simulator 114 to generate one or several illuminated portions of the simulation sled 108 and/or one or several shadows on or in the simulation sled 108 by sending the light simulator control signals from the processor 102 to the light simulator 114. In some embodiments, the step of block 412 can be performed simultaneous with the step of block 414.

After blocks 412 and 414, the process 400 proceeds to decision step 416, wherein it is determined whether to terminate the simulation. In some embodiments, this determination can be made by the processor 102 by determining if the narrative of the simulation has been completed, if the allocated time for the simulation is reached and/or passed, if one or several objectives of the simulation have been attained, or the like. If it is determined that the simulation is not to be terminated, then the process 400 proceeds to decision step 418, wherein it is determined if there is an additional user input. In some embodiments, this can include determining whether further electrical signals corresponding to user inputs at the user controls 112 have been received. If there have been additional user inputs, then the process 400 proceeds to block 402 and continues as outlined above. If there have been no additional user inputs, then the process 400 proceeds to block 404 and continues as outlined above.

Returning again to decision step 416, if it is determined to terminate the simulation, then the process 400 proceeds to block 420, wherein one or several simulation termination control signals are generated. In some embodiments, for example, these one or several simulation control signals can direct one or several features of the simulation system 100 to provide an indication of the termination of the simulation. These indications can include, for example, undimming of house lights, playing music indicative of the end of the simulation, rolling credits, releasing passenger restraints, or the like. After the simulation termination control signals have been generated, the process 400 proceeds to block 422, wherein the simulation is terminated. In some embodiments, the termination of the simulation can include the providing of the simulation termination control signals to the components of the simulation system 100 affected by the simulation termination.

V. Computer System

Figure 5:
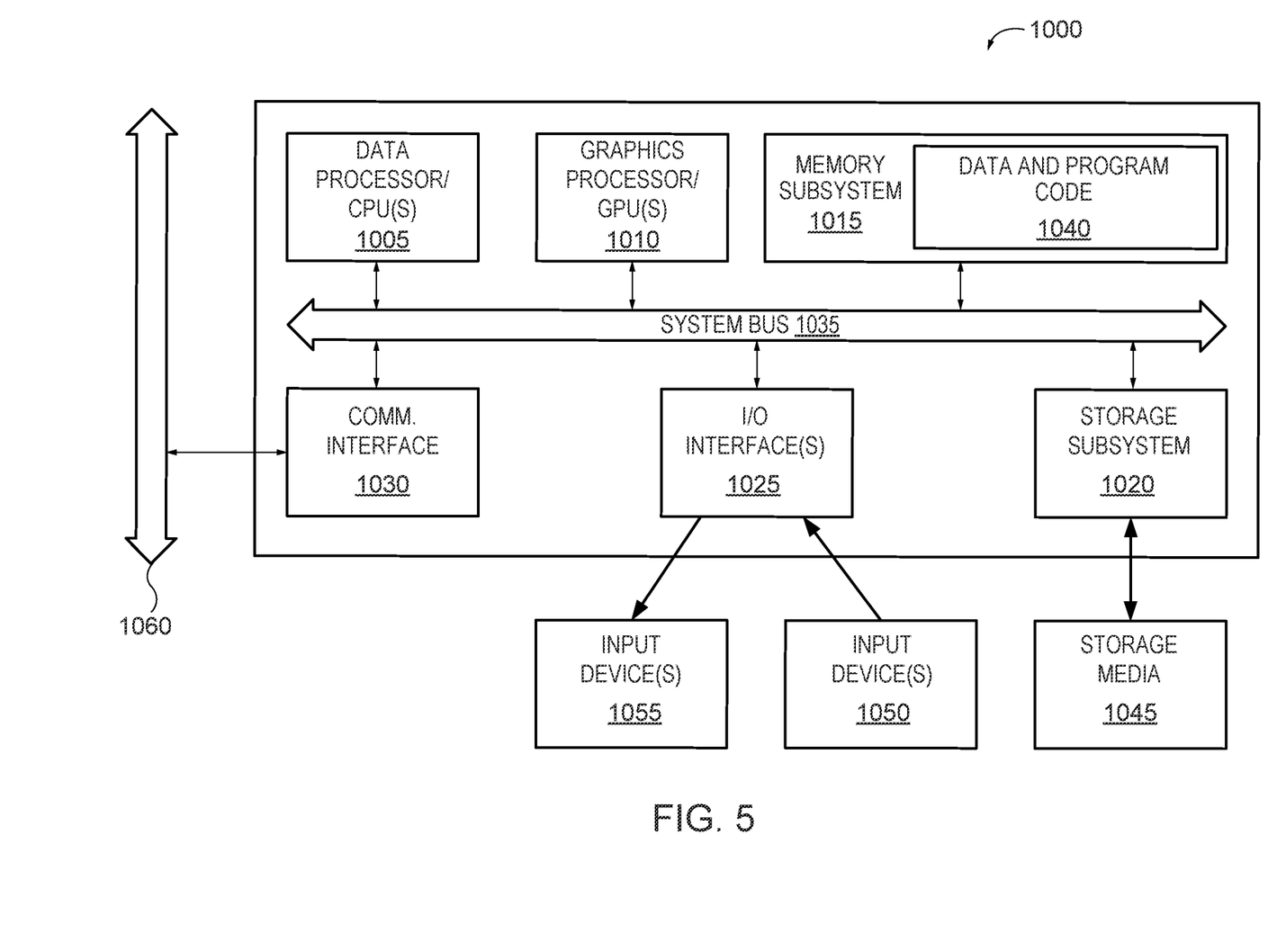
FIG. 5 is a block diagram of a computer system or information processing device that may incorporate an embodiment, be incorporated into an embodiment, or be used to practice any of the innovations, embodiments, and/or examples found within this disclosure.

FIG. 5 shows a block diagram of computer system 1000 that is an exemplary embodiment of the processor 102 and can be used to implement methods and processes disclosed herein. FIG. 5 is merely illustrative. Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such as connectivity and inter-device communication.

The one or more data processors or central processing units (CPUs) 1005 execute program code to implement the processes described herein. The one or more graphics processor or graphical processing units (GPUs) 1010 execute logic or program code associated with graphics or for providing graphics-specific functionality. Memory subsystem 1015 can store information, e.g., using machine-readable articles, information storage devices, or computer-readable storage media. Storage subsystem 1020 can also store information using machine-readable articles, information storage devices, or computer-readable storage media. Storage subsystem 1020 may store information using storage media 1045 that can be any desired storage media.

The one or more input/output (I/O) interfaces 1025 can perform I/O operations and the one or more output devices 1055 can output information to one or more destinations for computer system 1000. One or more input devices 1050 and/or one or more output devices 1055 may be communicatively coupled to the one or more I/O interfaces 1025. The one or more input devices 1050 can receive information from one or more sources for computer system 1000. The one or more output devices 1055 may allow a user of computer system 1000 to view objects, icons, text, user interface widgets, or other user interface elements.

Communications interface 1030 can perform communications operations, including sending and receiving data. Communications interface 1030 may be coupled to communications network/external bus 1060, such as a computer network, a USB hub, or the like. A computer system can include a plurality of the same components or subsystems, e.g., connected together by communications interface 1030 or by an internal interface.

Computer system 1000 may also include one or more applications (e.g., software components or functions) to be executed by a processor to execute, perform, or otherwise implement techniques disclosed herein. These applications may be embodied as data and program code 1040. Such applications may also be encoded and transmitted using carrier signals adapted for transmission via wired, optical, and/or wireless networks conforming to a variety of protocols, including the Internet.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An entertainment system comprising:
   a viewer space having surfaces and a place for a participant to view the viewer space;
   a display configured to display generated imagery viewable within the viewer space, wherein the imagery represents one or more light sources and shadow sources that appear to exist outside of the viewer space;
   an ambient light simulator configured to selectively illuminate at least portions of the surfaces of the viewer space; and
   a processor in communicating connection with the display and the ambient light simulator, wherein the processor is configured to:
      control the display to generate the imagery representing the one or more light sources and shadow sources;
      determine an effect of the one or more light sources and shadow sources on the surfaces of the viewer space; and
      control the ambient light simulator to selectively illuminate at least portions of the surfaces of the viewer space according to the determined effect of the one or more light sources and shadow sources.

2. The entertainment system of claim 1, wherein the ambient light simulator is controlled to selectively illuminate the at least portions of the surfaces of the viewer space with the generation of imagery corresponding to the one or more light sources and shadow sources.

3. The entertainment system of claim 1, wherein the one or more light sources and shadow sources are static with respect to the viewer space.

4. The entertainment system of claim 1, wherein the one or more light sources and shadow sources move with respect to the viewer space.

5. The entertainment system of claim 4, wherein the movement of the one or more light sources and shadow sources with respect to the viewer space varies based on received user inputs.

6. The entertainment system of claim 5, wherein the determined effect comprises dynamic simulated shadows cast based on the movement of the one or more light sources and shadow sources with respect to the viewer space and at least one surface of the viewer space.

7. The entertainment system of claim 6, wherein ambient light simulator comprises at least one of: a projector; and practical lighting.

8. The entertainment system of claim 1, wherein the ambient light simulator moves with respect to the viewer space.

9. The entertainment system of claim 1, wherein the ambient light simulator is static with respect to the viewer space.

10. The entertainment system of claim 1, wherein the determined effect comprises at least one of: a color; an intensity; and a position.

11. A method of simulation of ambient light produced by one or more light sources and shadow sources represented in generated imagery, the method comprising:
    providing a viewing space;
    controlling a display to generate imagery representing one or more light sources and shadow sources, wherein the generated imagery is viewable by a participant from the viewing space and wherein the one or more light sources and shadow sources appear to exist outside of the viewing space;
    determining an effect of the one or more light sources and shadow sources on surfaces of the viewing space; and
    controlling an ambient light simulator to selectively illuminate at least a portion of the surfaces of the viewing space according to the determined effect of the one or more light sources and shadow sources.

12. The method of claim 11, wherein the ambient light simulator is controlled to selectively illuminate the at least a portion of the surfaces of the viewing space simultaneous with the generation of imagery corresponding to the one or more light sources and shadow sources.

13. The method of claim 11, wherein the one or more light sources and shadow sources are static with respect to the viewing space.

14. The method of claim 11, wherein the one or more light sources and shadow sources move with respect to the viewing space.

15. The method of claim 14, wherein the movement of the one or more light sources and shadow sources with respect to the viewing space varies based on received user input.

16. The method of claim 15, wherein the determined effect comprises dynamic simulated shadows cast based on the movement of the one or more light sources and shadow sources with respect to the viewing space and at least one surface of the viewing space.

17. The method of claim 16, wherein the ambient light simulator comprises at least one of: a projector; and practical lighting.

18. The method of claim 11, wherein the ambient light simulator moves with respect to the viewing space.

19. The method of claim 11, wherein the ambient light simulator is static with respect to the viewing space.

20. The method of claim 11, wherein the determined effect comprises at least one of: a color; an intensity; and a position.

* * * * *